Feb. 16, 1965

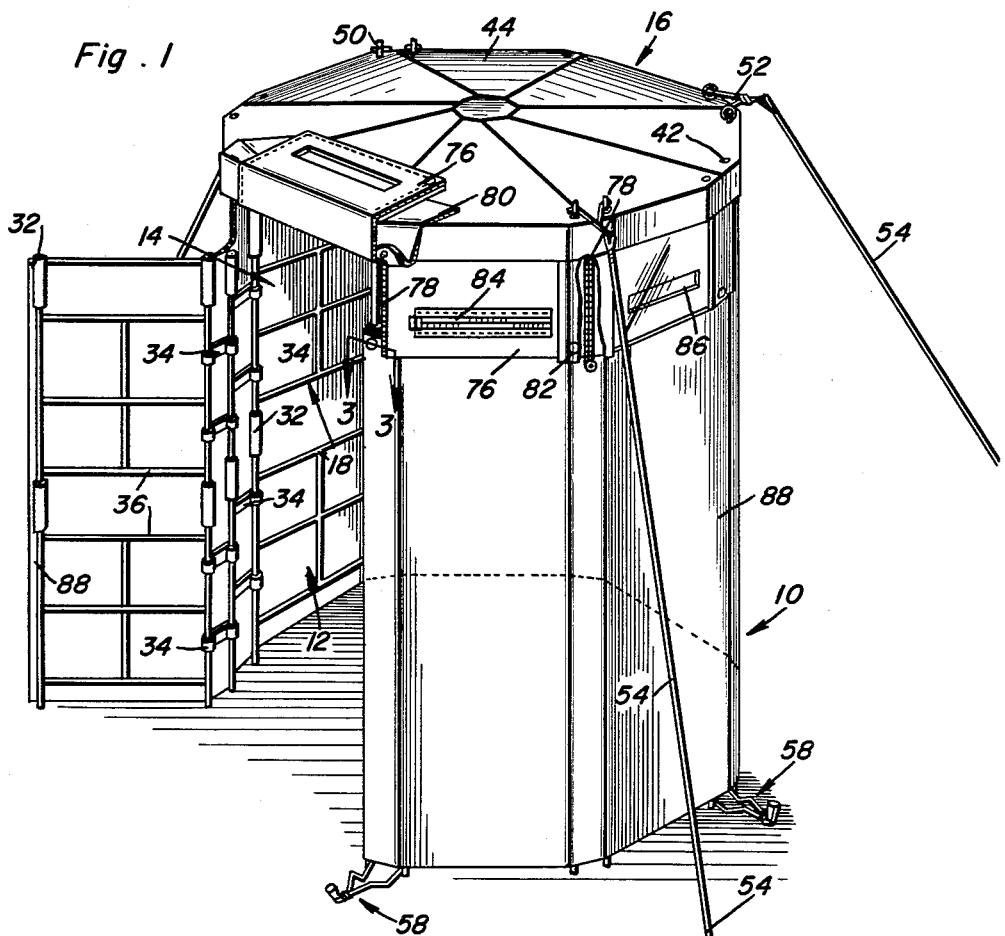
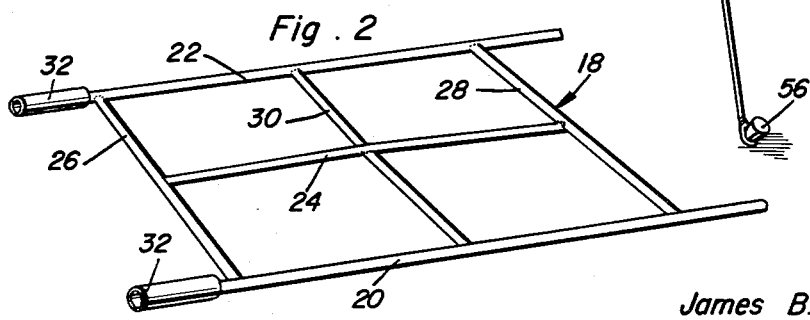
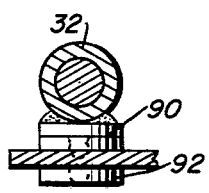
James B. McGerty
INVENTOR.

J. B. McGERTY 3,169,543

PORTABLE SHELTER

Filed June 21, 1962

James B. McGerty
INVENTOR.

BY *Clarence A. O'Brien*
*and Harvey B. Jackson*
Attorneys

Feb. 16, 1965
J. B. McGERTY
3,169,543
PORTABLE SHELTER
Filed June 21, 1962
4 Sheets-Sheet 3
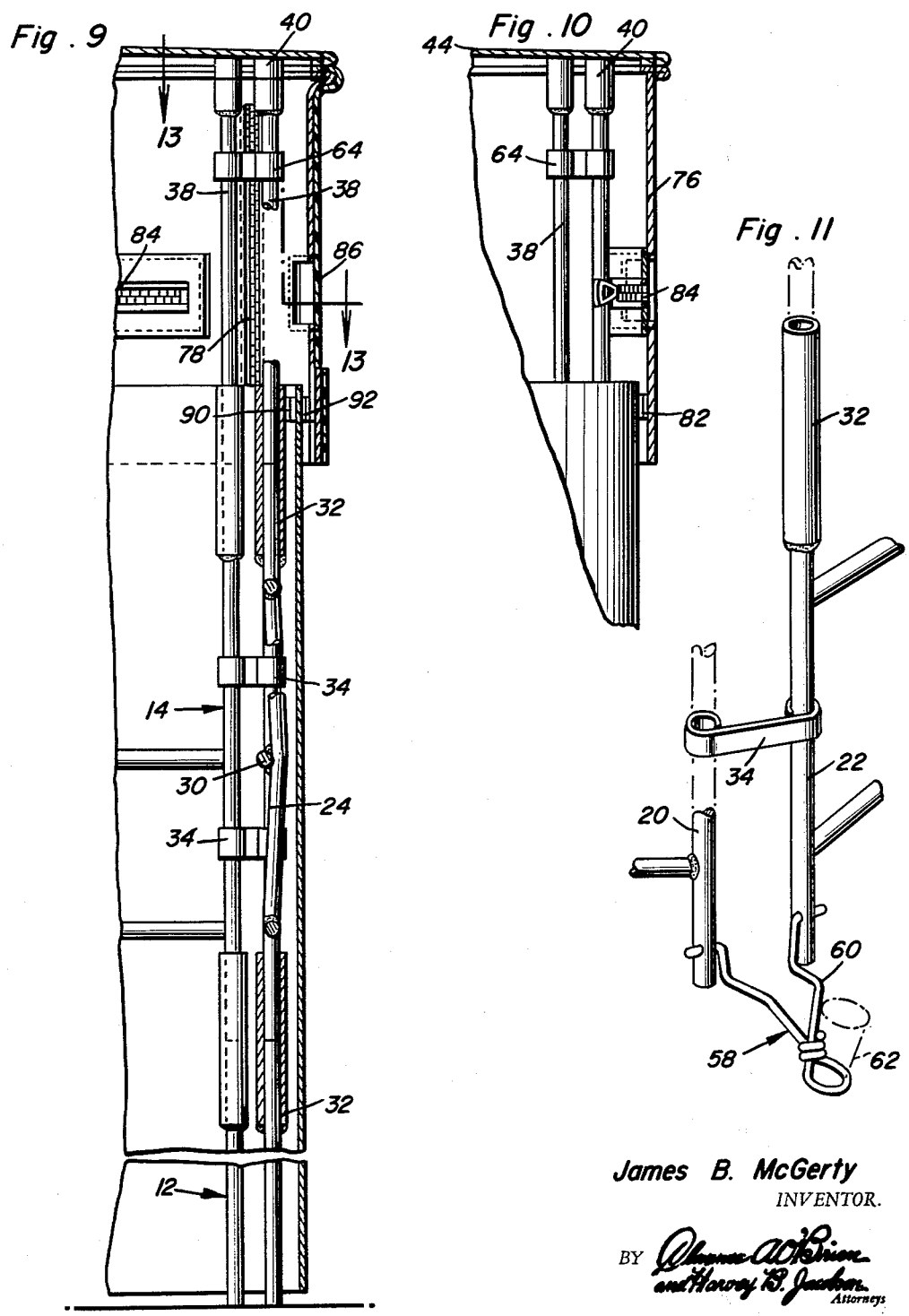
James B. McGerty
INVENTOR.
BY

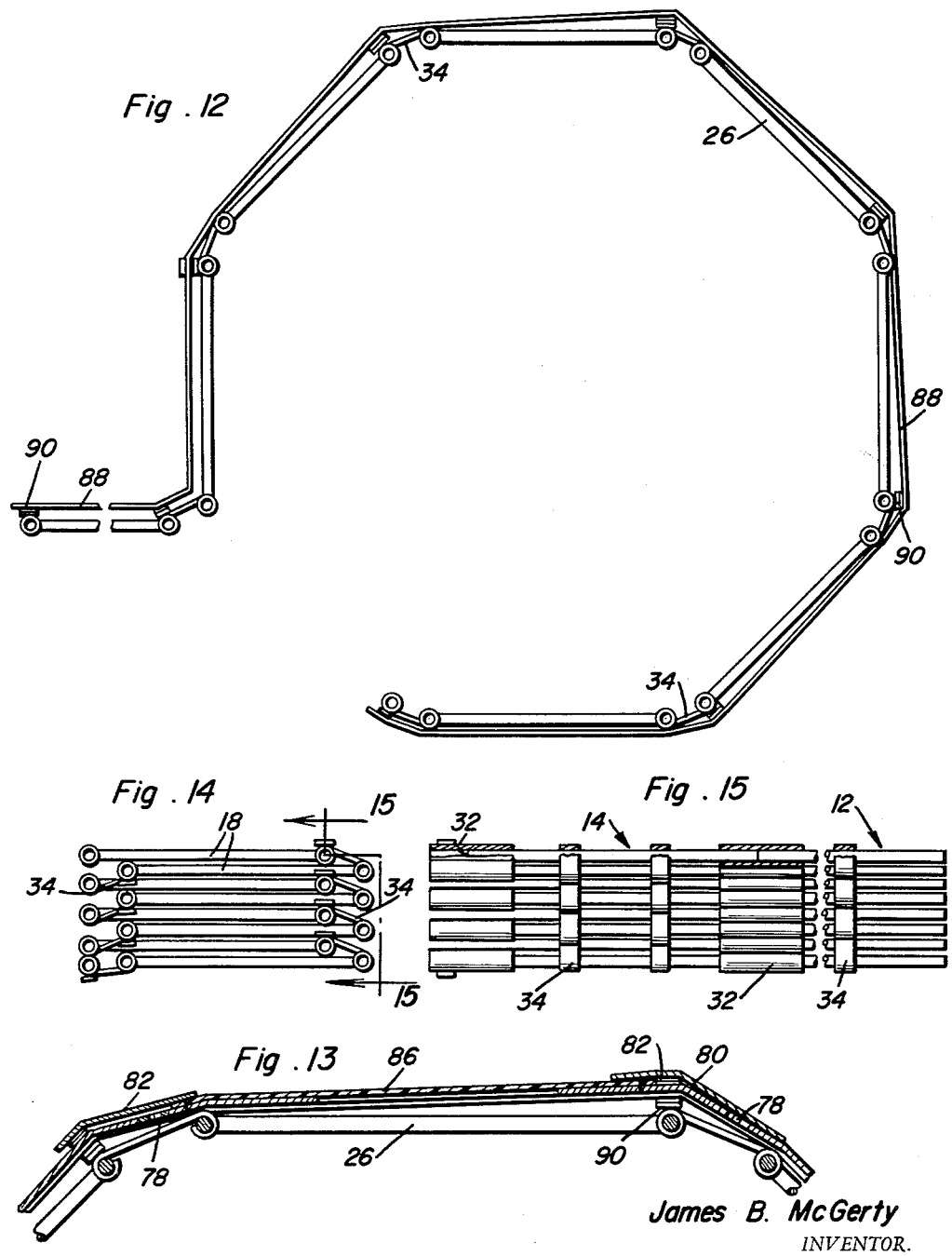

United States Patent Office 3,169,543
Patented Feb. 16, 1965

3,169,543
PORTABLE SHELTER
James B. McGerty, 3300 Alice, Dearborn, Mich.
Filed June 21, 1962, Ser. No. 204,097
6 Claims. (Cl. 135—1)

The present invention generally relates to shelters, and more particularly to a shelter which can be quickly collapsed into a compact package so as to enable it to be easily transported.

One of the primary objects of the present invention is the provision of a portable shelter suitable for use as a bath house, an ice fishing house, an animal hunting blind or an enclosure for any activities requiring use of a relatively small shelter.

In line with the above objects, it is intended that the present invention provide such a shelter which can be quickly and completely collapsed so as to enable it to be easily carried such as for example on the back of a camper in the manner of a knapsack.

It is a further object of the present invention to provide a shelter which is simple in construction and easily erected in a minimum of time.

Likewise, it is contemplated that the present invention provides a top for the shelter which can be used or not used depending upon the particular use to which the shelter is being put.

In regard to this shelter top, it is also an object of the present invention to provide a plurality of circumferentially spaced windows therein as well as a plurality of gun-slots alternating with the windows.

Additionally, it is an object of the present invention to provide a rigid structure which can afford many years of satisfactory use with a minimum amount of maintenance required.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the shelter with the top thereon and the door portion of the shelter in an open position;

FIGURE 2 illustrates a single panel of the framework of the shelter;

FIGURE 3 is a cross-sectional view taken substantially on a plane passing along line 3—3 in FIGURE 1 and illustrating the manner in which the shelter cover is snap-fastened to the framework;

FIGURE 9 is a cross-sectional view taken substantially on a plane passing along line 9—9 in FIGURE 4;

FIGURE 10 is a partial cross-sectional view taken substantially on a plane passing along 10—10 in FIGURE 4;

FIGURE 11 is a partial perspective view illustrating the manner in which the panels of each section are pivotally interconnected as well as the manner in which the base of the shelter is to be anchored;

FIGURE 12 is a plan view of the shelter illustrated in FIGURE 1 with the top removed;

FIGURE 13 is a partial cross-sectional view taken substantially on a plane passing along line 13—13 in FIGURE 9;

FIGURE 14 illustrates the sections in a collapsed position; and

FIGURE 15 is a view of the sections taken substantially on a plane passing along 15—15 in FIGURE 14.

Figure 4:
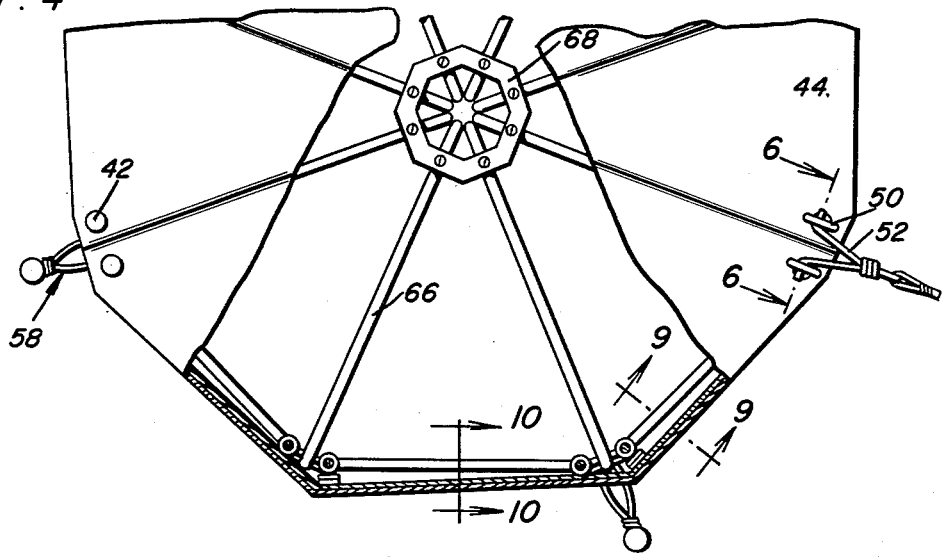
FIGURE 4 illustrates a partial top plan view of the shelter shown in FIGURE 1 with portions broken away so as to show the structure of the top.
Figure 5:
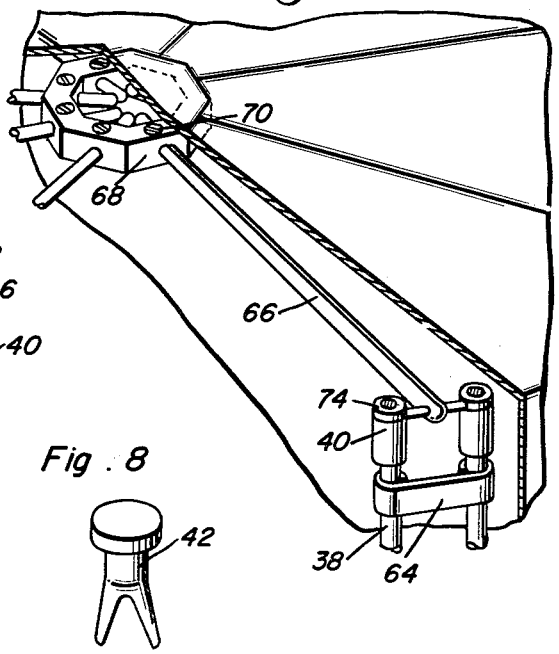
FIGURE 5 is a partial perspective view showing further details of the construction of the top.
Figure 6:
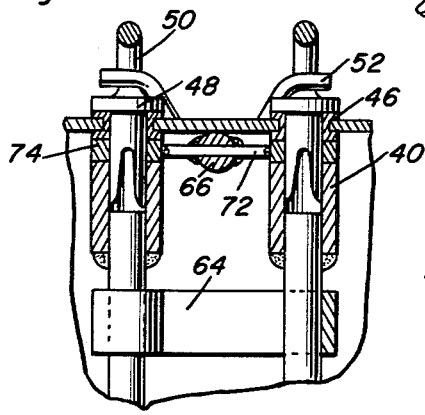
FIGURE 6 is a cross-sectional view taken substantially on a plane passing along line 6—6 in FIGURE 4.

Referring now more particularly to the drawings, the numeral 10 generally designates the shelter comprising the present invention. The shelter 10 consists basically of a lower section 12, an upper section 14, and a top section 16.

The lower and upper sections 12 and 14 are formed preferably of eight panels 18 which, when viewing the panels 18 in their upright position, each consists of three vertical members 20, 22 and 24, and three horizontal members 26, 28 and 30. These members 20–30, are preferably either rods or tubes interconnected by welding. As will be appreciated from FIGURE 2, which is an illustration of the type of panel used in both the lower section 12 and the upper section 14, the vertical rods 20 and 22 extend beyond the horizontal rods 26 and 28 and are provided at the upper projecting ends thereof with enlarged tubular sleeves 32 secured thereto and being of a size so as to telescopically receive therein superimposed rods which in the case of the lower section 12 would be the lower ends of the rods 20 and 22 of the superimposed section 14 and in the case of the upper section 14 would be the depending ends of the rods forming the top framework as shall be gone into in detail presently.

Interconnecting the adjacent panels 18 so as to form elongated sections 12 and 14 are a plurality of straps 34, the ends of which are engaged about the adjoining vertical rods 20 and 22 in a manner so as to enable the free pivoting of these rods in order that the sections 12 and 14 be easily and efficiently compacted as illustrated in FIGURES 14 and 15.

It is contemplated that the sections 12 and 14 formed in this manner be secured in superimposed relation by the insertion of the lower portion of the rod members 20 and 22 of the upper section 14 within the upwardly extending sleeves 32 of the lower sections 12 and the combined sections erected substantially in the shape of an octagon as best illustrated in FIGURES 1 and 12. Attention is directed to the fact that the vertically aligned end panels 36 are left unsecured along the one edge so as to enable their use as a door or entrance means to the enclosure. The other end of each section 12 and 14 can either terminate at the outer end of the superimposed panels, or can be provided with an additional vertical rod secured thereto by straps similar to straps 34 so as to present a completely symmetrical enclosure.

While the use of a top is not essential, it is preferred that such a top be provided so as to result in a complete enclosure. This top section 16 consists basically of pairs of vertical rods 38 of the same size as the rods of the panels 18, with the lower ends of the rods being received in the upwardly extending sleeves 32 of the adjacent vertical rods 20 and 22 of the upper section 14. The upper ends of these rods 38 are similarly provided with sleeves 40 for the reception of friction fit fastening elements 42 which are intended to maintain a superimposed cover 44, preferably of canvas, with the cover being provided with grommets 46 if so desired.

Figure 8:
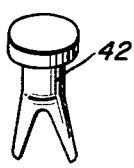
FIGURE 8 is a perspective view of one form of fastener used to maintain the top in position.
Figure 7:
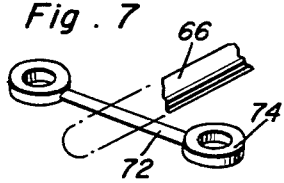
FIGURE 7 is a partial exploded perspective view illustrating the manner in which the end of each roof rib is provided with a cross bar which is in turn to be affixed to the vertical framework.

Alternating with the flat headed type fasteners 42 illustrated in FIGURE 8 are pairs of fasteners 48 provided at their upper ends with eyelets 50 for the reception therein of a tie member 52 to which an anchoring wire or guy 54 is secured, the lower end of wire 54 being anchored into the ground by suitable stake means 56. While the fasteners 42 and 48 have been specifically illustrated as having outwardly sprung lower ends so as to insure a good frictional grip, it will be readily apparent that other types of fasteners can be used within the scope of the invention. Further, as will be appreciated from FIGURES 1 and 4, the wires 54 are secured at every other joint of the enclosure and alternate with anchor means 58 provided at the lower end of the lower section 12, this anchor means 58 consisting of a tie member 60 having outwardly sprung legs the outer ends of which are engaged through apertures within the vertical members 20 and 22 and the inner ends of which are formed into a loop for the reception of a stake 62 therethrough. In the event that the structure is used without the top section 16 thereof, the wires 54 are intended to be secured to the upper ends of the section 14 in a similar manner by means of the fastening elements 48 being inserted within the upper end of the tubular members 32 on the panels 18 of the upper section 14.

Returning now to the structure of the top section 16, it will be noted that the vertical rods 38 at each panel joint can, if so desired, be provide with a connecting strap 64.

In order to support the cover 44, a plurality of radially extending ribs 66 are provided with the inner ends of the ribs 66 being releasably secured within a hub means 68 by extending through apertures therein, with conventional means, such as setscrews 70 being used so as to maintain the ribs 66 in position. The outer ends of each rib 66 is provided with a transversely extending bar 72 having rings 74 provided at its outer ends, which rings 74 are of a size so as to complement the upper end of an adjacent sleeve 40 and receive the fasteners 42 or 48 therethrough thereby acting as a means for stabilizing entire shelter 10. Also in regard to this top 16, it is contemplated that a slight slope be provided downwardly from the center thereof toward the edges.

Secured to and depending from the top cover 44 are a plurality of peripheral flaps 76 having free lower ends and Zipper means 78 interconnecting the adjoining edges of the flaps 76. In order to protect the Zipper 78 it is contemplated that overlying covering flaps 80 be provided which can be secured in depending position by means of a simple snap fastener 82. Attention is specifically directed towards FIGURE 1 wherein one of the flaps 76 is illustrated in its open position thereby facilitating entrance to and exit from the shelter. The remainder of the flaps 76 can, if so desired, also be opened in a similar manner. Further, so as to facilitate the use of the shelter for purposes of hunting, every other flap 76 is provided with an elongated slot having a Zipper closure 84 therein, this slot being provided for purposes of extending a weapon therethrough. Also, alternating with the gun slot flaps are a plurality of flaps having a transparent window 86 therein. This window 86 can, if so desired, be of glass, however, it is preferred that a transparent material such as plastic be provided somewhat in the manner illustrated in section in FIGURE 9.

In order to enclose the lower portion of the shelter 10, it is contemplated that an elongated sheet or cover 88 be provided, which cover, preferably of canvas is to be secured to the shelter framework by means of conventional snap fasteners 90. As best seen in FIGURE 3, an additional portion of a snap fastener 92 is provided on the outer face of the canvas adjacent its upper edge so as to provide a means for snapping down the lower corner of the superimposed flap 76 which is in turn also provided with an additional portion of the snap fastener so as to receive the fastener 82 of the covering flap 80.

With attention being specifically directed toward FIGURES 14 and 15, it will be noted that the sections 12 and 14, upon being folded represent a compact bundle having a planar dimension only slightly greater than that of a single panel 18. Further, it will be recognized that while FIGURE 15 illustrates the lower and upper sections 12 and 14 folded as a single unit, the section can be folded disengaged from each other thereby enabling one folded section to be placed upon the other thereby further compacting the shelter so as to enable it to be easily transported.

From the foregoing, it is considered to be readily apparent that a novel shelter has been defined which, in addition to being readily adaptable for various purposes requiring such a shelter, such as ice fishing, hunting or bathing, is capable of being compacted into a comparatively small package so as to enable it to be carried, as for example, on a person's back in the manner of a knapsack, with little difficulty thereby easily providing shelter means in normally inaccessible places such as various hunting sites which can only be reached by walking. The portability of this shelter is provided by means of a plurality of collapsible sections which can be quickly assembled or disassembled by means of various telescopically interfitting portions and requiring the use of no special tools to effect its erection or dismantling. It will be appreciated that in addition to merely providing a shelter, the present invention provides a strong highly rigid enclosure provided with a framework of interconnected rods formed so as to enclose the interior space on all sides as well as provide a top thereof. Additionally, in regard to the manner in which the panels of each section are pivotally interconnected, it will be appreciated that the use of an elongated strap means enables the reverse folding of alternate panels so as to obtain a maximum compacting of the sections as illustrated in FIGURES 14 and 15.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable shelter comprising an enclosure forming collapsible vertical wall section, and a removable top for said enclosure, said top including a central hub, a plurality of radially extending ribs projecting outwardly from said hub, means releasably securing the inner end of each rib to said hub, a plurality of vertical rods, said rods releasably engaging the wall section at peripherally spaced points about the upper edge and projecting vertically thereabove, the outer ends of said ribs being releasably secured to the upper ends of said rods, a top cover positioned over and supported on said ribs, means releasably securing said top cover in position, a plurality of depending flaps orientated adjacent each other about the outer edge of said top, each flap having the upper edge thereof secured to the top cover and freely depending therefrom, means releasably sealing the adjacent edges of said flaps to each other, and transparent windows in selected ones of said flaps.

2. The structure of claim 1 including elongated slots in other ones of said flaps, and means for selectively sealing said slots.

3. The structure of claim 2 wherein said wall section consists of several rigid panels, and means pivotally interconnecting said panels in edge-to-edge relation to each other for enabling a collapsing of the section by a folding of the panels into a bundle having a planar dimension substantially equal to a single one of said panels, and a cover releasably secured to and about said wall section, the lower edges of said flaps overlapping the upper edge of said wall section cover and being releasably secured thereto.

4. The structure of claim 3 wherein each panel consists of two vertical edge members and a plurality of horizontal members fixed therebetween, said edge members having axially aligned upwardly projecting sleeves secured to the upper ends thereof, the lower ends of said vertical rods being telescopically received in said sleeves, said rods having axially aligned upwardly projecting sleeves on the upper end thereof, the outer end of each rib being orientated in a vertical plane generally between the vertical edge members of a pair of adjacent panels, a transversely extending bar fixed to the outer end of each rib, said bar having vertical apertures through the opposite end portions thereof, said apertures being aligned with the rod sleeves of the adjacent rods, and an elongated fastener extending through each aperture and into the subjacent sleeve so as to secure the rib thereto.

5. The structure of claim 4 including ground engaging anchoring wires, selected ones of the fasteners including integral upwardly projecting eyelets, said anchoring wires being engaged through said eyelets.

6. The structure of claim 5 including anchoring means engaged with the lower ends of selected pairs of adjacent vertical edge members of adjacent panels, said anchoring means projecting outwardly from said edge members and including a ground stake receiving aperture therethrough.

References Cited in the file of this patent

UNITED STATES PATENTS

| | | |
|---|---|---|
| 539,226 | Lorenz | May 14, 1895 |
| 997,270 | Cofrode | July 11, 1911 |
| 2,865,386 | Burns | Dec. 23, 1958 |
| 2,928,404 | Klages | Mar. 15, 1960 |
| 3,011,586 | Harvey | Dec. 5, 1961 |
| 3,084,703 | Lefebvre et al. | Apr. 9, 1963 |

FOREIGN PATENTS

| | | |
|---|---|---|
| 11,459 | Great Britain | May 1, 1897 |